June 26, 1951    C. B. HORSLEY ET AL    2,558,089
GEOACOUSTIC APPARATUS FOR UNDERGROUND EXPLORATION
Filed Dec. 22, 1949

Inventors;
Caperton B. Horsley,
Gordon C. Seavey,
by
Att'y.

Patented June 26, 1951

2,558,089

UNITED STATES PATENT OFFICE 2,558,089

GEOACOUSTIC APPARATUS FOR UNDERGROUND EXPLORATION

Caperton B. Horsley, Westwood, and Gordon C. Seavey, Arlington, Mass., assignors to Sonic Research Corporation, Boston, Mass., a corporation of Massachusetts Application December 22, 1949, Serial No. 134,572

4 Claims. (Cl. 116—137)

This invention relates to improved means for generating sound waves in the ground, which procedure is useful in various types of underground exploration and analysis of subterranean structures, and particularly in the field of seismic prospecting.

In the course of underground exploration, as in the search for mineral deposits, or in the analysis of subterranean structures to determine the probable presence of oil, for example, it is desirable to have available a source of high-intensity sound waves which is adapted to transmit these waves into the ground from a position at its surface. These waves, after having been reflected or refracted by underground discontinuities, may then be detected at other surface locations at various distances from the source, using microphones or geophones of conventional design, and the nature and extent of underground structures, faults, or other discontinuities may be deduced or inferred from the relative timing and intensity of the impulse received by the detectors.

The use of dynamite explosions as the source of sound waves in such underground exploration is conventional and widespread; however, this use is not wholly satisfactory, because of the attendant danger and the necessity for drilling blast holes, in addition to the fact that the dynamite blast produces shock waves of extremely irregular frequency content which can be neither controlled nor duplicated.

The use of a continuous train of sound waves of predetermined frequency, whose intensity varies approximately sinusoidally with time, has been frequently proposed for underground exploration, and a number of vibratory devices have been used for this purpose. In general, these vibrators transmit energy into the ground as a result of reaction against the acceleration of a massive member, which may, for example, be rotating eccentrically. Thus, a flat member contacting the ground may have mounted on it a wheel with a weight attached to one point of the rim. As the wheel turns, the force resulting from acceleration of the mass will be directed alternately toward and away from the ground, and the ground-contacting member will transmit this variation in force into the ground in the form of sound waves varying sinusoidally with time.

In order to obtain high intensity waves with such devices, it is necessary to develop a large amount of force, which may be obtained either by using a large mass, or high acceleration, or both. In any event, the force developed is transmitted through the bearings which support the rotating member. Thus, there is a severe limitation on the amount of wave energy available from these devices, imposed by the load and peripheral speed limits at which bearings can successfully operate. The limitation is exceptionally severe where high acceleration of a relatively small mass is resorted to, since high speed bearings are acutely limited in load at high peripheral speeds.

We have invented means for overcoming this bearing limitation, and of obtaining high transmitted intensities, by the device of using in combination a large massive member operatively connected to driving means and to a radiating member through an appropriate lever system. With this arrangement, it is possible to impart to the radiating member, and thus to the ground, intense periodic forces resulting from reaction to the motion of the massive member. Motion of the massive member itself, however, is imparted in such a way that force exerted by the driving means is relatively small, and loads on the drive mechanism bearings are correspondingly lessened. Indeed it is obvious that the force requirement at the driving end of the levers is lessened by a factor which is equal to the ratio of lengths of the lever arms from the fulcrum to the points of attachment to the driving means and massive member, respectively.

The principal object of the invention is to provide an improved instrumentality for generating sound waves at high intensity at the surface of the earth, and directing these waves into the interior of the earth.

A further object is to provide means for so generating sound waves which avoid the limitations on available intensity imposed by the load and peripheral speed limits of high speed bearings.

A still further object of the invention is to provide such means in a form which may be easily adapted to the demands of portability, ease of assembly, cheapness, etc. for use in the field.

These and other objects of the invention will be more clearly understood with reference to the accompanying drawings, in which.

Figure 1:
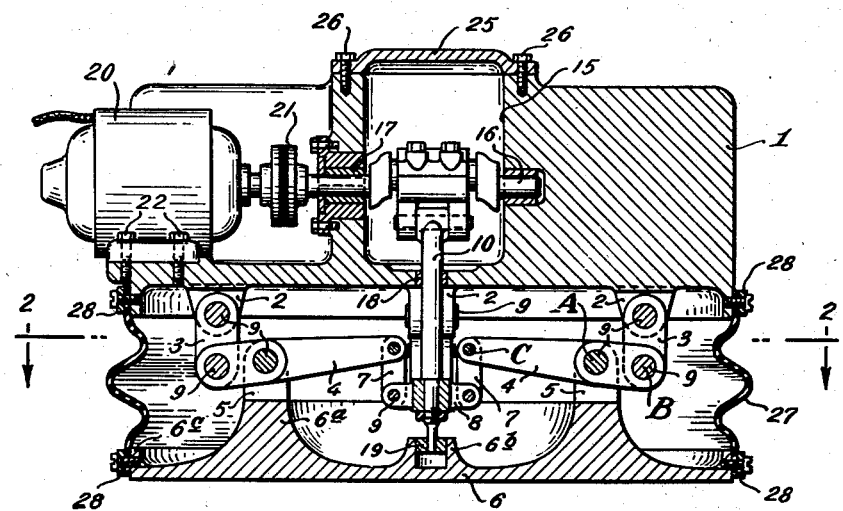
Fig. 1 is a view in cross-section and partial elevation illustrating one preferred embodiment of the sound generating apparatus.
Figure 2:
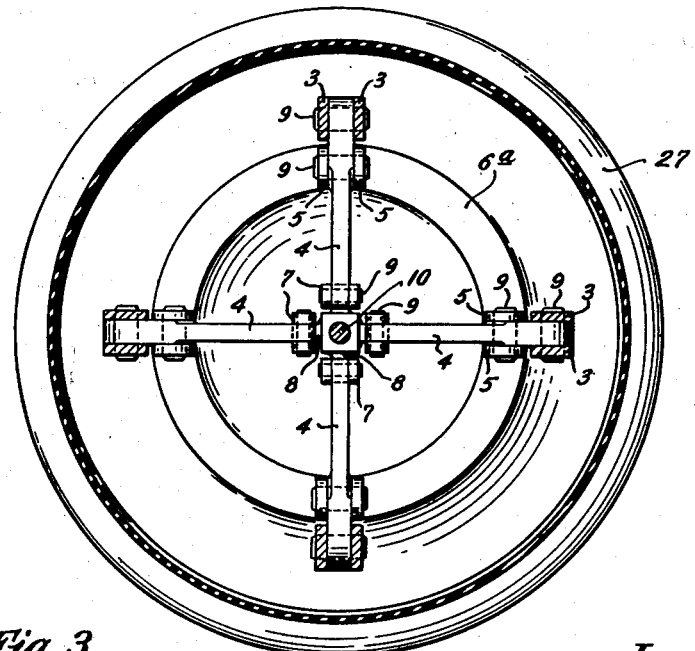
Fig. 2 is a plan view taken on the line A—A of Fig. 1.

The apparatus of our invention may be more fully understood with reference to the embodiment shown in Fig. 1, although it is not intended that the invention should be limited thereto.

In Fig. 1 there is shown a massive member 1, bearing mounting lugs 2, operatively connected through connecting links 3 to lever arms 4. The fulcrum points of the lever arms 4 are pinned to lugs 5, symmetrically disposed on an annular mounting rib 6a, which is an integral part of the radiating member 6. The drive ends of lever arms 4 are attached through links 7 to a common collar 8, and the entire lever assembly is held together with pins 9.

Radiating member 6 consists of a circular face plate having an annular reinforcing rib 6a, to which are attached the mounting lugs 5, as previously mentioned. The entire radiating member may, as in this embodiment, be cast as one piece.

In the massive member 1 there is located a recess 15 wherein is mounted a crankshaft 16 rotating in bearings 17 in the wall of the recess. The crankshaft activates drive shaft 10 through a conventional yoke and pin arrangement. Bearing 18, in the bottom section of massive member 1, and bearing 19, mounted in a central boss 6b of the radiating member 6, constrain the shaft 10 for vertical oscillation.

Crankshaft 16 is driven by motor 20 operating through a flexible coupling 21. The motor is located in a lateral recess of the massive member 1, and is fastened in place with screws 22. In the embodiment shown, the use of a motor of rugged construction, and of the flexible coupling 21, makes it unnecessary to provide further shock mounting for the motor. Cleanliness of the unit is maintained by adding a cover 25 fastened by screws 26 over the recess 15, and by adding a flexible boot 27 held by clamping rings 28 suitably fastened to massive member 1 and to the rim 6c of radiating member 6.

Figure 3:
Fig. 3 is a diagrammatic view further illustrating the basic operation of the invention.

Operation of the unit may be most conveniently understood with reference both to the embodiment shown in Fig. 1 and to the diagrammatic view given in Fig. 3.

In operation, the motor 20 acting through the crank mechanism, the collar 8, and links 7, oscillates the drive ends of the lever arms 4 at points C in the vertical direction. At the same time, the massive member 1 is caused to oscillate in the vertical direction by virtue of the oscillatory force transmitted to it through connecting links 3 at points B. The amplitude of the vertical oscillation at point B is reduced from that at points C by a factor equal to the ratio of distances AC/AB, in accordance with the well-known laws governing levers.

During operation, as member 1 moves upward, reaction to this motion is transmitted through lever arms 4 through points A to the radiating member 6, and the reactive force is transmitted to the ground. Conversely, as member 1 moves downward toward the radiating member 6, the reactive force transmitted to the ground is lessened. Thus, as member 1 performs vertical oscillation which is substantially sinusoidal in time, as imparted by the crank mechanism, sinusoidal variations in pressure are transmitted to the ground and are radiated into it as sound waves.

It will be noted that the force required to actuate the device is applied in such a manner that the mechanical advantage of this type of lever is made use of. Thus, the force required at points C to oscillate massive member 1 is less by a factor of the ratio AC/AB, than that which would be required if the force were to be applied directly at points B.

In the embodiment illustrated, the relationship of displacements and of forces is improved by the fact that the crankshaft is carried in the moving member 1. Specifically, the relation may be written as follows:

$$\text{Amplitude of motion of member 1 with respect to radiating member } 6 = \frac{\text{Crank throw}}{1 + AC/AB}$$

The arrangement is therefore such that there is a greater mechanical advantage than would be the case if the crank were mounted separately from the body of the apparatus. In either arrangement, however, the stress requirements on the actuating crank mechanism are greatly reduced by this mechanical advantage, and the problem of obtaining adequate drive bearings is no longer a severe limitation.

It is obvious that the specific embodiment illustrated in Fig. 1 may be modified in various details without departing from the spirit of the invention; thus, for example, the number of lever arms 4 may be other than four, and the value of the distance ratio AC/AB may be made any desirable value. Further, the drive motor of the mechanism may be separately mounted and coupled through a flexible shaft, or various other modifications may be resorted to without departing from the spirit of the invention.

In the interests of adapting the unit to field use, it may also be desirable to supplant the illustrated massive member 1 with a flat table on which there may be placed such weights as may be convenient, as rocks or sand, or the member may be formed as a water tank which may be filled from a nearby stream.

Having thus described our invention, what we claim and desire to secure by Letters Patent is:

1. Apparatus for generating sound waves and transmitting the same into the ground while minimizing loads on the bearings of the driving mechanism which comprises, in combination, a relatively light sound radiating member having an extensive surface adapted to engage the ground, a relatively heavy massive member vertically above said radiating member, a lever system supporting said massive member on said radiating member for vertical oscillatory movement, said lever system comprising a series of radially symmetrically arranged levers fulcrumed near their outer ends upon portions of said radiating member and sustaining said massive member on their outer ends and having their inner ends connected together, a vertically reciprocable drive shaft in driving connection with said inner ends for operating said levers in unison, and a driving mechanism for reciprocating said shaft for causing vertical oscillatory motion of said massive member at sonic frequencies.

2. Apparatus according to claim 1 in which said driving mechanism is mounted on said massive member.

3. Apparatus according to claim 2 in which said driving mechanism comprises an electric motor and crank, the latter being connected to said shaft.

4. Apparatus for generating sound waves and transmitting the same into the ground while minimizing bearing loads on the driving mechanism which comprises, in combination, a relatively light sound radiating member having an extensive surface adapted to engage the ground, a relatively heavy massive member vertically above said radiating member, a lever system fulcrumed on said radiating member supporting said massive member on said radiating member for vertical reciprocation, and a driving mechanism connected to said lever system for causing vertical oscillatory motion of said massive member at sonic frequencies, said lever system being arranged to support said massive member in symmetrical fashion, and the connections of said driving mechanism and said massive member to said lever system being so spaced with respect to the fulcruming of the latter as to reduce the amplitude of motion of said massive member below that of said driving mechanism thereby avoiding excessive bearing loads on the latter.

CAPERTON B. HORSLEY.
GORDON C. SEAVEY.

REFERENCES CITED

The following references are of record in the file of this patent:

UNITED STATES PATENTS

| Number | Name | Date |
|---|---|---|
| 2,054,428 | Klocke | Sept. 15, 1936 |
| 2,087,811 | Patrick | July 20, 1937 |